United States Patent [19]

Nodelman

[11] Patent Number: 5,028,635

[45] Date of Patent: Jul. 2, 1991

[54] POLYUREA-CYCLIC CARBONATE RIM SYSTEMS HAVING IMPROVED FLOW PROPERTIES

[75] Inventor: Neil H. Nodelman, Pittsburgh, Pa.

[73] Assignee: Mobay Corporation, Pittsburgh, Pa.

[21] Appl. No.: 546,078

[22] Filed: Jun. 29, 1990

Related U.S. Application Data

[63] Continuation-in-part of Ser. No. 463,762, Jan. 12, 1990, abandoned, which is a continuation of Ser. No. 346,186, May 4, 1989, abandoned, which is a continuation-in-part of Ser. No. 212,751, Jun. 28, 1988, abandoned.

[51] Int. Cl.$^5$ ............................................. C08G 18/14
[52] U.S. Cl. ....................................... 521/130; 521/163; 521/164; 528/68; 528/73; 528/76; 528/77; 264/328.1; 264/328.2
[58] Field of Search .................... 264/328.1, 328.2; 521/163, 164, 130; 528/68, 73, 76, 77

[56] References Cited

U.S. PATENT DOCUMENTS

| | | | |
|---|---|---|---|
| 3,751,392 | 8/1973 | Olstowski | 521/99 |
| 3,883,466 | 5/1975 | Olstowski | 260/32.2 |
| 4,033,908 | 1/1977 | Hopkins, Jr. et al. | 521/130 |
| 4,071,482 | 1/1978 | Hopkins, Jr. et al. | 521/131 |
| 4,218,543 | 8/1980 | Weber et al. | 521/51 |
| 4,396,729 | 8/1983 | Dominquez et al. | 521/51 |
| 4,433,067 | 2/1984 | Rice et al. | 521/51 |
| 4,444,910 | 4/1984 | Rice et al. | 521/51 |
| 4,530,941 | 7/1985 | Turner et al. | 521/176 |
| 4,568,702 | 2/1986 | Mascioli | 521/131 |
| 4,709,002 | 11/1987 | Younes | 528/53 |
| 4,731,427 | 3/1988 | Younes | 528/53 |
| 4,774,263 | 9/1988 | Weber et al. | 521/51 |
| 4,774,264 | 9/1988 | Weber et al. | 521/51 |

FOREIGN PATENT DOCUMENTS 0276452 3/1988 European Pat. Off. .

*Primary Examiner*—John Kight, III
*Assistant Examiner*—Frederick Krass
*Attorney, Agent, or Firm*—Joseph C. Gil

[57] ABSTRACT

The present invention is directed to a RIM process and an isocyanate-reactive mixture useful therein. The mixture comprises i) a polyether having at least two isocyanate-reactive groups and a molecular weight of from 1800 to 12,000 in which at least 50% of the isocyanate-reactive groups are primary and/or secondary amine groups, ii) an amine-terminated chain extender, and iii) from 2 to 20 parts by weight per 100 parts by weight of components b) and c) of propylene carbonate.

3 Claims, No Drawings

POLYUREA-CYCLIC CARBONATE RIM SYSTEMS HAVING IMPROVED FLOW PROPERTIES

CROSS REFERENCE TO RELATED APPLICATION

This application is a continuation-in-part of U.S. application Ser. No. 07/463,762, filed Jan. 12, 1990, now abandoned which in turn was a continuation of U.S. application Ser. No. 07/346,186, filed May 4, 1989, now abandoned which in turn was a continuation-in-part of U.S. application Ser. No. 212,751, filed June 28, 1988 now abandoned.

BACKGROUND OF THE INVENTION

Reaction injection molded (RIM) polyurethanes are well known in the art and have met with substantial commercial success. U.S. Pat. No. 4,218,543 describes the use of relatively high molecular weight hydroxyl group containing materials, certain aromatic diamines as chain extenders, and isocyanates for the production of RIM parts.

More recently the activity in the art has been towards the production of polyurea RIM parts. Typically, these parts are made from relatively high molecular weight polyethers which contain amine groups, diamine chain extenders and isocyanates. Typical of the materials used and the technologies known in the art are those described in U.S. Pat. Nos. 4,774,263, 4,774,264, 4,396,729, 4,433,067, 4,444,910 and 4,530,941. As is known in the art, RIM parts are generally produced from two separate streams. One stream generally contains the isocyanate component, while the other stream contains the amine-containing polyether and the amine chain extender. One problem is that blends of certain of the amine-containing polyether and the amine chain extender are generally too viscous for use in conventional commercial RIM machinery. An object of the present invention was therefore to provide a mixture of amine-containing polyether and amine chain extender having a substantially reduced viscosity and thus improved flow characteristics. Additionally, this improvement in flow properties would have to be achieved without adversely affecting the physical properties of the final RIM part.

The use of cyclic alkylene carbonates in polyurethane chemistry is known. U.S. Pat. No. 3,883,466 describes the use of a cyclic alkylene carbonate as a liquid modifier to moderate the reaction exotherm between the hydroxy component and the polyisocyanate in the production of a rigid, dense rapid-setting polyurethane. U.S. Pat. Nos. 4,709,002 and 4,731,427 describe the use of cyclic alkylene carbonates in the production of rigid RIM polyisocyanurate and urethane-modified polyisocyanurate parts. These two references do not indicate why the cyclic alkylene carbonate is used but do suggest that the carbonate can be added to the isocyanate stream in order to reduce its viscosity.

U.S. Pat. Nos. 4,000,105 and 4,154,716 describe a variety of different liquid modifiers, including alkylene carbonates, which can be used in the production of rigid and non-elastomeric polyurethanes. The references do not indicate why the liquid modifiers are added. U.S. Pat. No. 4,530,941 suggests at column 7, lines 36–52, that the modifiers described in these two patents can be used in the production of polyurea RIM parts.

DESCRIPTION OF THE INVENTION

The present invention is directed to a process for making a reaction injection molded elastomer comprising injecting a reaction mixture into a mold cavity via a RIM machine with the ratio of components being such that the isocyanate index is from about 70 to about 130. The reaction mixture comprises
  a) an organic di- and/or polyisocyanate,
  b) a polyether having at least two isocyanate reactive groups and a molecular weight of from 1800 to 12,000 in which at least 50% of the isocyanate-reactive groups are primary and/or secondary amine groups,
  c) an amine-terminated chain extender, and
  d) from 2 to 20 parts by weight per 100 parts by weight of components b) and c) of propylene carbonate.

The present invention is also directed to an isocyanate-reactive mixture comprising
  i) a polyether having at least two isocyanate-reactive groups and a molecular weight of from 1800 to 12,000 in which at least 50% of the isocyanate-reactive groups are primary and/or secondary amine groups,
  ii) an amine-terminated chain extender, and
  iii) from 2 to 20 parts by weight per 100 parts by weight of components i) and ii) of propylene carbonate.

Several advantages are seen in using propylene carbonate according to the present invention. The addition of the carbonate results in a significant lowering of the viscosity of the B-side. It is also particularly surprising that excellent heat sag properties are attained. In general, one would have expected that the highly polar carbonate would dissolve in the hard block phase causing a significant decrease in the stiffness at elevated temperatures. Furthermore, it was surprisingly found that systems containing propylene carbonate were significantly slower reacting when compared to systems containing the preferred liquid modifiers described in U.S. Pat. Nos. 4,000,105 and 4,154,716. This property is particularly desirable because it allows for the complete filling of larger RIM parts.

The propylene carbonate employed in the present invention are used in an amount of from 2 to 20 parts, and preferably 4 to 15 parts by weight, based on 100 parts by weight of the isocyanate-reactive components.

The isocyanate (component a)) used in the process of the present invention is preferably an aromatic diisocyanate and/or polyisocyanates i.e., a polyisocyanate in which all of the isocyanate groups are aromatically bound. Examples of such compounds include 2,4- and/or 2,6-diisocyanatotoluene; 2,2'-, 2,4'- and/or 4,4'-diisocyanatodiphenyl methane, mixtures of the last-mentioned isomers with their higher homologues (such as are obtained from the known reaction of the phosgenation of aniline/formaldehyde condensates); compounds containing urethane groups obtained as products of reaction of the above-mentioned di- and/or polyisocyanates with subequivalent quantities of polyhydroxyl compounds having molecular weights of from 62 to 10,000, (e.g. ethylene glycol, trimethylol propane, propylene glycol, dipropylene glycol or polypropylene glycols, and polyester glycols within the above-mentioned molecular weight range) di- and/or polyisocyanates modified by the partial carbodiimidization of the isocyanate groups of the above-mentioned di- and/or polyisocyanates; methyl-substituted diisocyanates of the diphenyl methane series or mixtures thereof (for example, those described in European Specification No. 0,024,665); or mixtures of such aromatic di- and polyisocyanates.

Included among the preferred isocyanates are the derivatives of 4,4'-isocyanatodiphenyl methane which are liquid at room temperature. Specific examples of such compounds are polyisocyanates containing urethane groups obtainable according to German Patent 1,618,380 (U.S. Pat. No. 3,644,457) by reacting 1 mol of 4,4'-diisocyanatodiphenyl methane with from 0.05-0.3 mol of low molecular weight diols or triols, (preferably polypropylene glycols having molecular weights below 700); diisocyanates based on 4,4'-diisocyanatodiphenyl methane containing carbodiimide and/or urethane imine groups, such as those disclosed in U.S. Pat. Nos. 3,152,162; 3,384,653 and 3,449,256, German Offenlegungsschrift No. 2,537,685 and European Specification No. 5233 (U.S. Ser. No. 903,308). Also included among the preferred polyisocyanates are the corresponding modified products based on mixtures of 2,4'- and 4,4'-diisocyanatodiphenyl methane or mixtures of the above-described modified 4,4'-diisocyanatodiphenyl methanes with minor quantities of higher than difunctional polyisocyanates of the diphenyl methane series. Such polyisocyanates are described in German Offenlegungsschrift 2,624,526. The preferred polyisocyanate mixtures of the diphenyl methane series are liquid at room temperature and have optionally been chemically modified as described above, with an average isocyanate functionality of from 2 to 2.2 (preferably 2) containing 4,4'-diisocyanatodiphenyl methane as the main component (amounting to more than 50 wt. %).

The polyethers used (as component b)) in the present invention contain at least two isocyanate reactive groups in end positions and have an average molecular weight (calculated from the functionality and the isocyanate reactive group content) of from 1800 to 12,000, preferably from 2000 to 8000. At least 50 equivalent percent (and preferably from 80-100 equivalent percent) of the isocyanate reactive end groups are primary and/or secondary (preferably primary) aromatically or aliphatically bound amino groups with the remainder being primary and/or secondary aliphatically bound hydroxyl groups. When polyether mixtures are used, individual components of the mixture may have a molecular weight below 1800 (for example between 500 and 1800), provided that the average molecular weight of the mixture is within the range of 1800 to 12,000. The use of such mixtures in which individual components have a molecular weight below 1800 is, however, not preferred.

Compounds containing amino end groups may also be attached to the polyether chain by urethane or ester groups. These "amino polyethers" may be prepared by known methods. One such method is the amination of polyhydroxyl polyethers (e.g., polypropylene glycol ethers) by a reaction with ammonia in the presence of Raney nickel and hydrogen (Belgian Patent No. 634,741). U.S. Pat. No. 3,654,370 discloses the preparation of polyoxyalkylene polyamines by reaction of the corresponding polyol with ammonia and hydrogen in the presence of a nickel, copper, chromium catalyst. The preparation of polyethers containing amino end groups by the hydrogenation of cyanoethylated polyoxypropylene ethers is described in German Patent 1,193,671. Other methods for the preparation of polyoxyalkylene (polyether) amines are described in U.S. Pat. Nos. 3,155,728 and 3,236,895 and French Patent No. 1,551,605. French Patent No. 1,466,708, discloses the preparation of polyethers containing secondary amino end groups. Also useful are the polyether polyamines described in U.S. Pat. Nos. 4,396,729, 4,433,067, 4,444,910 and 4,530,941, the disclosures of which are herein incorporated by reference.

Relatively high molecular weight polyhydroxypolyethers suitable for the process of the present invention may be converted into the corresponding anthranilic acid esters by reaction with isatoic acid anhydride. German Offenlegungsschriften 2,019,432 and 2,619,840 and U.S. Pat. Nos. 3,808,250; 3,975,428 and 4,016,143 disclose methods for making polyethers containing aromatic amino end groups.

Relatively high molecular weight compounds containing amino end groups may be obtained according to German Offenlegungsschrift 2,546,536 or U.S. Pat. No. 3,865,791 by reacting isocyanate prepolymers based on polyhydroxyl polyethers with hydroxyl-containing enamines, aldimines or ketimines and hydrolyzing the reaction product.

The aminopolyethers which have been obtained by the hydrolysis of compounds containing isocyanate end groups are preferred starting materials (German Offenlegungsschrift 2,948,419). Polyethers preferably containing two or three hydroxyl groups are reacted (in the process disclosed in German Offenlegungsschrift 2,948,419) with polyisocyanates to form isocyanate prepolymers and the isocyanate group is then converted in a second step into an amino group by hydrolysis. Most preferred are polyamines prepared by hydrolyzing an isocyanate compound having an isocyanate group content of from 0.5 to 40% by weight. The most preferred polyamines are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful polyamines via isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645, European Patent 0,097,299 and German Offenlegungsschrift 2,948,419, all the disclosures of which are herein incorporated by reference. Similar products are also described in U.S. Pat. Nos. 4,506,039, 4,525,590, 4,532,266 and 4,532,317 and in U.S. application Ser. Nos.: 437,641, filed Oct. 19, 1982; 778,656, filed Sept. 23, 1985; 895,629, filed Aug. 11, 1986; 908,535, filed Sept. 16, 1986, and 916,923, filed Oct. 9, 1986. The most preferred polyamines contain from 2 to 4 amine groups and have molecular weights of from 350 to 6000.

The "amino polyethers" used (as component b)) in the present invention are in many cases mixtures of the compounds described above. These mixtures generally should contain (on a statistical average) two to three isocyanate reactive end groups.

In the process of the present invention, the "amino polyethers" may also be used as mixtures with polyhydroxy polyethers which are free from amino groups (such as those exemplified in U.S. Pat. No. 4,218,543 or even highly branched polyetherpolyols having an average hydroxyl-functionality of about 3 to 6 and molecular weights of about 500 to 1000), although such mixtures are not preferred. If such mixtures are used, however, it is necessary to ensure that at least 50 equivalent percent of the isocyanate reactive groups present in the mixture are primary and/or secondary amino groups.

The diamines used as component c) in the process of the present invention generally have molecular weights from 108-400 and preferably contain exclusively aromatically bound primary or secondary (preferably primary) amino groups. Examples of such diamines are: 1,4-diaminobenzene, 2,4-diaminotoluene, 2,4- and/or 4,4'-diaminodiphenyl methane, 3,3'-dimethyl-4,4'-diaminodiphenylmethane, 4,4'-diaminodiphenyl-propane-(2,2), mixtures of such diamines, and the like.

The preferred diamines have alkyl substituents in at least one position which is ortho to the amino groups. The most preferred diamines are those in which at least one alkyl substituent is present in the position ortho to the first amino group and two alkyl substituents are located in the position ortho to the second amino group, each alkyl substituent having 1 to 4 carbon atoms. It is particularly preferred to use such compounds in which an ethyl, n-propyl, isopropyl, t-butyl and/or methylthio substituent is present in at least one position ortho to the amino groups and possibly methyl substituents in other positions ortho to the amino groups.

Specific examples of preferred amines include 2,4-diaminomesitylene, 1,3,5-trimethyl-2,4-diamino-benzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tretraethyl-4,4'-diaminodiphenyl methane, 3,5,3',5'-tetraisopropyl-4,4'-diaminodiphenyl methane, 3,5-diethyl-3'-5'-diisopropyl-4,4-diaminodiphenyl methane, t-butyl toluene diamine and bis-thiomethyl toluene diamine. Also useful are adducts of these amines with epoxy resins. It is also within the scope of this invention to use aliphatic amine chain extender materials as described in U.S. Pat. Nos. 4,246,363, 4,269,945, 4,495,081 and 4,530,941, although the aliphatic amines are not preferred.

The above-mentioned diamines may, of course, also be used as mixtures. It is particularly preferred to use 1-methyl-3,5-diethyl-2,4-diaminobenzene or a mixture of this compound with 1-methyl-3,5-diethyl-2,6-diaminobenzene.

The diamine chain lengthening agent (component c)) in the process of the present invention is preferably used in quantities of from 5 to 50 wt. %, most preferably from 10 to 40 wt. % (based on the polyether used as component b)).

Known mold release agents may be used to produce molded articles which have excellent mold release characteristics. Such internal mold release agents are among the auxiliary agents which may advantageously be used in the process of the present invention. In principle, any mold release agent known in the art may be used in the present invention but internal mold release agents such as those described, for example, in German Offenlegungsschrift No. 1,953,637 (U.S. Pat. No. 3,726,952), German Offenlegungsschrift 2,121,670 (British Patent 1,365,215), German Offenlegungsschrift 35 2,431,968 (U.S. Pat. No. 4,098,731), German Offenlegungsschrift 2,404,310 (U.S. Pat. No. 4,058,492) and U.S. Pat. Nos. 4,519,965 and 4,581,386 are preferred. Preferred mold release agents include the salts (containing at least 25 aliphatic carbon atoms) of fatty acids having at least 12 aliphatic carbon atoms and primary mono-, di- or polyamines containing two or more carbon atoms or amines containing amide or ester groups and having at least one primary, secondary or tertiary amino group; esters of mono- and/or polyfunctional carboxylic acids and polyfunctional alcohols containing saturated and/or unsaturated COOH and/or OH groups and having hydroxyl or acid numbers of at least five, ester type reaction products of ricinoleic acid and long chained fatty acids; salts of carboxylic acids and tertiary amines; and natural and/or synthetic oils, fats or waxes. Also preferred are the zinc salts described in U.S. Pat. Nos. 4,519,965 and 4,581,386.

The oleic acid or tall oil fatty acid salts of the amine containing amide groups which has been obtained by the reaction of N-dimethylaminopropylamine with oleic acid or tall oil fatty acid is particularly preferred.

Apart from the above described preferred mold release agents, other mold release agents known in the art may in principle be used either alone or in a mixture with the preferred mold release agents. These additional mold release agents include, for example, the reaction products of fatty acid esters with polyisocyanates (according to German Offenlegungsschrift 2,319,648); the reaction products of polysiloxanes containing reactive hydrogen atoms with mono and/or polyisocyanates (according to German Offenlegungsschrift 2,356,692 (U.S. Pat. No. 4,033,912)); esters of mono- and/or polycarboxylic acids and polysiloxanes containing hydroxyl methyl groups (according to German Offenlegungsschrift 2,363,452 (U.S. Pat. No. 4,024,090)); and salts of polysiloxanes containing amino groups and fatty acids (according to German Offenlegungsschrift 2,417,273 or German Offenlegungsschrift 2,431,968 (U.S. Pat. No. 4,098,731)).

If an internal mold release agent is used, it is generally used in an amount which totals from 0.1 to 25 wt. %, preferably 1 to 10 wt. % of the whole reaction mixture.

No catalyst is required for the reaction between isocyanate groups and isocyanate reactive groups of the reactant polyether and diamine (components b) and c)). However, catalysts known and commonly used in the production of polyurethane foams and microcellular elastomers are included in the group of auxiliary agents and additives appropriate to the present invention.

Suitable catalysts include tertiary amines such as triethylamine, tributylamine, N-methylmorpholine, N-ethyl-morpholine, N-cocomorpholine, N,N,N',N'-tetramethylethylene diamine, 1,4-diazabicyclo-(2,2,2)-octane, N-methyl-N'-dimethylaminoethyl piperazine, N,N-dimethylbenzylamine, bis-(N,N-diethylamino)-adipate, N,N-diethyl benzylamine, pentamethyl diethylene triamine, N,N-dimethylcyclohexylamine, N,N,N',N'-tetramethyl-1,3-butanediamine, 1,2-dimethylimidazole and 2-methylimidazole and 2-methylimidazole.

Organometallic catalysts may also be used in the practice of the present invention. Particularly useful organometallic catalysts include organic tin catalysts such as tin-(III) salts of carboxylic acids (e.g., tin-(II)-acetate, tin-(II)-laurate) and the dialkyl tin salts of carboxylic acids (e.g., dibutyltin-diacetate, dibutyltindilaurate, dibutyltinmaleate or dioctyltindiacetate) alone or in combination with tertiary amines. Other suitable catalysts and details concerning the action of these catalysts are given in Kunststoff Handbuch, Volume VII, published by Vieweg and Hochtlen, Carl Hanser Verlag, Munich 1966, e.g., on pages 96 to 102.

If a catalyst is used, quantities of about 0.001 to 10 wt. %, preferably 0.05 to 1 wt. % (based on component b)) are appropriate.

The products of the process of the present invention are preferably molded elastomeric articles. Blowing agents may be used to produce molded articles having a compact surface and a cellular interior. The blowing agents used may be water and/or readily volatile organic substances and/or dissolved inert gases.

Examples of suitable organic blowing agents include acetone; ethylacetate; methanol; ethanol; halogen-substituted alkanes such as methylene chloride, chloroform, ethylidene chloride, vinylidene chloride, monofluorotrichloromethane, chlorodlfluoromethane and dichlorodifluoromethane; and butane, hexane, heptane or diethyl ether.

Nitrogen, air and carbon dioxide are examples of suitable inert gases.

The effect of a blowing agent may also be obtained by the addition of compounds which decompose at temperatures above room temperature to release gases, for example nitrogen. Azo compounds such as azoisobutyric acid nitrile are examples of such compounds. Other examples of blowing agents and details concerning the use of blowing agents may be found in Kunststoff Handbuch, Volume VII, published by Vieweg and Hochtlen, Carl Hanser Verlag, Munich 1966, e.g., on pages 108 and 109, 453 to 455 and 507 to 510.

In accordance with the present invention, surface active additives (emulsifiers and foam stabilizers) may also be used as reaction mixture components. Suitable emulsifiers include the sodium salts of ricinoleic sulfonates or of fatty acids or salts of fatty acids and amines (such as oleic acid diethylamine or stearic acid diethanolamine). Alkali metal or ammonium salts of sulfonic acids (e.g. of dodecyl benzene sulfonic acid or of dinapthyl methane disulfonic acid) or of fatty acids such as ricinoleic acid or polymeric fatty acids may also be used as surface active additives.

If foam stabilizers are used, it is preferred that they be water soluble polyether siloxanes. These compounds are generally a copolymer of ethylene oxide and propylene oxide linked to a polydimethyl siloxane group. Foam stabilizers of this type are described in U.S. Pat. No. 2,764,565.

Other auxiliary agents and additives which may optionally be used in the process of the present invention include known cell regulators (such as paraffins or fatty alcohols or dimethyl polysiloxanes), known pigments, dyes and flame retarding agents (e.g. tris-chloroethyl phosphate and polyphosphate) stabilizers against aging and weathering, plasticizers, fungistatic and bacteriostatic substances, and fillers (such as barium sulfate, glass fibers, kieselguhr or whiting).

Other examples of suitable surface active additives and foam stabilizers, flame retardants, plasticizers, dyes, fillers and fungistatic and bacteriostatic substances and details concerning the use of mode of action of these additives may be found in Kunststoff Handbuch, Volume VII, published by Vieweg and Hochtlen, Carl Hanser Verlag, Munich 1966, e.g., on pages 103 to 113.

When carrying out the process of the present invention, the quantity of polyisocyanate (component a)) should preferably be such that the isocyanate index is from 70 to 130, most preferably 90 to 110 in the reaction mixture. By "isocyanate index" is meant the quotient of the number of isocyanate groups divided by the number of isocyanate reactive groups, multiplied by 100. When calculating the isocyanate index, any isocyanate reactive groups possible present in the mold release agents (carboxyl groups) are not taken into account.

The process of the present invention is carried out by the known reaction injection molding technique (RIM process). Two streams are generally employed in this molding technique. In the present invention, the polyisocyanate (component a)) is the first reactant and the "polyamine component" (i.e., the mixture of polyether component b), the diamine component c) and the carbonate d)), is the second reactant. If any auxiliary agents or additives are used, they are generally mixed with the "polyamine component". However, it may be advantageous, for example when using a mold release agent containing isocyanate groups, to incorporate the release agent with the reactant polyisocyanate (component a)) before the process of the present invention is carried out. It is possible in principle to use mixing heads in which three or four separate components may be simultaneously introduced so that no preliminary mixing of the individual components is required. The quantity of reaction mixture introduced into the mold is generally calculated to produce molded articles having densities of from 0.8 to 1.4 g/cm$^3$, preferably from 0.9 to 1.2 g/cm$^3$. When mineral fillers are used, however, the molded articles may have densities above 1.2 g/cm$^3$. The articles may be removed from the mold after they have been left in there from 5 to 90 seconds, preferably from 20 to 60 seconds.

The reactant mixture is generally introduced into the mold at a starting temperature of from 10° to 60° C., preferably from 20° to 50° C. The temperature of the mold itself is generally from 40° to 100° C., preferably from 50° to 70° C.

The molded articles obtainable by the process of the present invention are particularly suitable for the manufacture of flexible automobile bumpers or car body parts. Appropriate variation of the starting components (particularly use of a relatively small proportion of diamine (component c)) makes it possible, however, to obtain flexible shoe soles with good abrasion resistance and excellent mechanical strength.

The invention is further illustrated but is not intended to be limited by the following examples in which all parts and percentages are by weight unless otherwise specified.

EXAMPLES

In the examples, the following materials were used:

POLYETHER AMINE: prepared by hydrolyzing a prepolymer formed from toluene diisocyanate and a 4800 molecular weight glycerine/propylene oxide/ethylene oxide polyether (having 17% by weight ethylene oxide termination); the hydrolyzed product has an amine number of 30.3.

DETDA: diethyl toluene diamine.

MOD-DETDA: a reaction product prepared by reacting parts by weight of DETDA with 4 parts by weight of EPON 828 (a bisglycidyl ether of Bisphenol A available from Shell).

M-4050: a propylene oxide/ethylene diamine adduct having an OH number of 630.

DB OIL: a castor oil available from Cas Chem.

Zn: zinc stearate.

L-5304: a silicone surfactant available from Union Carbide.

EC: ethylene carbonate.

PC: propylene carbonate.

TCB: 1,2,4 trichlorobenzene.

DPE: diphenyl ether.

EAA: ethyl acetoacetate.

DOP: dioctyl phthalate.

ISO: the isocyanate used was a blend of (i) 20 parts by weight of a polymethylene poly(phenylisocyanate) having an isocyanate content of 32.5%, with a 19% by weight of 2,4'-isomer content, and an isocyanate functionality of about 2.4, and (ii) 80 parts by weight of a 19% isocyanate content prepolymer prepared by reacting a) 56 parts of 4,4'-methylene bis(phenylisocyanate), b) 6 parts by weight of a carbodiimide-group modified 4,4'-methylene bis(phenylisocyanate) having an NCO content of 29.3%, and c) a 2000 molecular weight polyester diol (based on adipic acid) 1,4-butane diol and ethylene glycol). The blend had an NCO content of 21.5% by weight.

EXAMPLES 1 through 6

RIM plaques were prepared using a laboratory piston metering unit and clamping unit. The metering unit was a two component instrument having a maximum metering capacity of 0.6 liters. A rectangular mold, 300 mm×200 mm×3 mm was used to mold the samples under the following conditions:

Component A temperature: 40° C.
Component B temperature: 60° C.
Isocyanate Index: 105
Mold temperature: 65° C.
Mix pressure: 2646 psi
Demold time 45 sec The formulations used and the physical properties were as indicated in the following table. The samples were tested for density (ASTM 0-792) flex modulus (ASTM 0-790) tensile strength and elongation (ASTM D-638), heat sag (ASTM D-3769), notched Izod (ASTM D-256), and tear strength-die "C" (ASTM D-624). Examples 1 and 4 are comparative examples.

TABLE 1

| B-side in PBW | EXAMPLE | | | | | |
|---|---|---|---|---|---|---|
| | 1 | 2 | 3 | 4 | 5 | 6 |
| Polyether Amine | 65.75 | 65.75 | 65.75 | 69.25 | 69.25 | 69.25 |
| DETDA | 26.0 | 26.0 | 26.0 | — | — | — |
| MOD-DETDA | — | — | — | 30 | 30 | 30 |
| M-4050 | 3.0 | 3.0 | 3.0 | — | — | — |
| Zn | 2.5 | 2.5 | 2.5 | — | — | — |
| DB Oil | 2.0 | 2.0 | 2.0 | — | — | — |
| L5304 | 0.75 | 0.75 | 0.75 | 0.75 | 0.75 | 0.75 |
| EC | — | 5.0 | — | — | 5.0 | — |
| PC | — | — | 5.0 | — | — | 5.0 |
| Viscosity B-side @ 25° C. Brookfield, mPa · s | 10,000 | 7,200 | 6,450 | 14,000 | 10,000 | 9,400 |
| Iso, PBW | 75.3 | 75.3 | 75.3 | 71.8 | 71.8 | 71.8 |
| Density, PCC | 70 | 70 | 70 | 70 | 70.1 | 69.3 |
| Flex Mod, psi | 101,000 | 81,000 | 86,000 | 94,000 | 76,000 | 83,000 |
| Tensile Strength, psi | 5,080 | 4,585 | 4,950 | 5,005 | 4,395 | 4,575 |
| Elongation, % | 125 | 145 | 160 | 135 | 120 | 115 |
| Heat Sag: | | | | | | |
| (4", 325° F.)mm | 5.0 | 6.0 | 7.0 | 4.0 | 4.0 | 2.5 |
| (6", 250° F.)mm | 5.0 | 7.0 | 5.0 | 5.0 | 6.0 | 1.5 |
| Notched Izod ft.-lb/in | 5.3 | 6.3 | 6.7 | 5.9 | 7.1 | 6.2 |
| Tear Strength, Die "C" lbs/in | 730 | 740 | 752 | 753 | 707 | 697 |

In the examples, the addition of the propylene carbonate resulted in significant lowering of the viscosity of the B-side. What is particularly surprising about the data is that excellent heat sag properties were substantially maintained. One would have expected that the highly polar carbonate would dissolve in the hard block phase causing a significant decrease in the stiffness at elevated temperatures.

EXAMPLES 7 through 12

Using the identical technique as set forth in Examples 1-6, additional plaques were prepared using the formulations set forth in Table 2. The test results were as set forth in Table 2. Examples 7 and 9 through 12 are comparative examples.

TABLE 2

| B-Side in PBW | EXAMPLE | | | | | |
|---|---|---|---|---|---|---|
| | 7 | 8 | 9 | 10 | 11 | 12 |
| Polyether Amine | 65.75 | 62.75 | 62.75 | 62.75 | 62.75 | 62.75 |
| DETDA | 26 | 29 | 29 | 29 | 29 | 29 |
| M-4050 | 3 | 3 | 3 | 3 | 3 | 3 |
| Zn | 2.5 | 2.5 | 2.5 | 2.5 | 2.1 | 2.5 |
| DB Oil | 2 | 2 | 2 | 2 | 2 | 2 |
| L5304 | 0.75 | 0.75 | 0.75 | 0.75 | 0.75 | 0.75 |
| PC | — | 5 | — | — | — | — |
| TCB | — | — | 5 | — | — | — |
| DPE | — | — | — | 5 | — | — |
| EAA | — | — | — | — | 5 | — |
| DOP | — | — | — | — | — | 5 |
| Flex Mod, psi | 84,000 | 92,000 | 90,000 | 93,000 | 95,000 | 70,000 |
| Tensile Strength, psi | 4,700 | 5,400 | 5,400 | 5,200 | 5,000 | 5,100 |
| Elongation % | 127 | 160 | 143 | 144 | 158 | 146 |
| Heat Sag: | | | | | | |
| (4", 325° F.), mm | 6.5 | 4.5 | 3.7 | 4.7 | 9.0 | 5.7 |
| (6", 250° F.), mm | 6.3 | 5.5 | 3.7 | 6.8 | 8.2 | 7.7 |
| Notched Izod: ft-lb/in | 6.7 | 6.7 | 5.9 | 6.2 | 7.5 | 6.1 |

The formulations of Examples 7 through 12 were also tested for reactivity. 100 parts of weight each formulation were introduced into an open can. Rotational viscosities were then obtained from the reacting mixtures using a commercially available Servodyne device. The data are displayed as viscosity versus time profiles, with the point where the isocyanate is poured into the B-side being zero on the time scale. The time is then measured from this point to where the viscosity vs. time curve becomes vertical. This point is recorded as the gel time. The results obtained were as follows:

| FORMULATION | GEL TIME, seconds |
|---|---|
| 7 | 3.34 |
| 8 | 3.56 |
| 9 | 3.24 |
| 10 | 3.24 |
| 11 | 3.16 |
| 12 | 3.28 |

As is apparent, the control, Example 7, had 26 parts of DETDA, while all other formulations had 29 parts. Accordingly, it would have been expected that all the systems containing the additives would be faster reacting than the control.

EXAMPLES 13 through 19

Using the identical technique as set forth in Examples 1-6, additional plaques were prepared using the formulations set forth in Table 3. Examples 13 and 15 through 19 are comparative examples. The formulation from Example 7 was also tested and is a comparative example.

TABLE 3

| B-Side in PBW | EXAMPLE | | | | | | |
|---|---|---|---|---|---|---|---|
| | 13 | 14 | 15 | 16 | 17 | 18 | 19 |
| Polyether Amine | 67.75 | 62.75 | 62.75 | 62.75 | 62.75 | 62.75 | 62.7 |
| DETDA | 29 | 29 | 29 | 29 | 29 | 29 | 29 |
| M-4050 | 3 | 3 | 3 | 3 | 3 | 3 | 3 |
| Zn | 2.5 | 2.5 | 2.5 | 2.5 | 2.5 | 2.5 | 2.5 |
| DB Oil | 2 | 2 | 2 | 2 | 2 | 2 | 2 |
| L5304 | 0.75 | 0.75 | 0.75 | 0.75 | 0.75 | 0.75 | 0.75 |
| PC | — | 5 | — | — | — | — | — |
| TCB | — | — | 5 | — | — | — | — |
| DPE | — | — | — | 5 | — | — | — |
| EAA | — | — | — | — | 5 | — | — |
| DOP | — | — | — | — | — | 5 | — |
| EC | — | — | — | — | — | — | 5 |

The mold (dimensions 300 mm×200 mm×3 mm) contains two pressure transducers which were placed 30 mm from the front and rear of the mold (as measured in the longest direction). The mold was filled using a Hennecke MQB mixhead which has an ejector piston to clean out the mixhead chamber. The shot time is the time between the end of the shot (mixhead closing) and the time the ejector piston comes forward. The pressure is measured as a function of time delay of the stroke of the cleaning piston after a shot time of 0.9 seconds. Pfront-Prear is the difference in the maximum pressure registered by the two pressure transducers. The differences are reported as the ratio of the differences to the pressure differences resulted from the use of the formulation of Example 7. The resultant ratios are interpreted as relative rates of solidification. A formulation with a "lower" ratio takes longer to solidify than a formulation with a "higher" ratio. The results were set forth in Table 4 below.

TABLE 4

| | Pressure Difference (Pfront-Prear)/Pressure Difference (Pfront-Prear) control | | | | | | | |
|---|---|---|---|---|---|---|---|---|
| Shot Time (sec) | Example | | | | | | | |
| | 7 | 13 | 14 | 15 | 16 | 17 | 18 | 19 |
| 0.9 | 1.00 | 1.00 | 1.00 | 1.00 | 1.00 | 1.00 | 1.00 | 1.00 |
| 1.0 | 1.00 | 1.00 | 1.00 | 1.00 | 1.00 | 1.00 | 1.00 | 1.00 |
| 1.1 | 1.00 | 1.66 | 0.23 | 1.45 | 2.24 | 1.85 | 1.72 | 1.13 |
| 1.2 | 1.00 | 2.45 | 0.37 | 1.70 | 2.44 | 2.04 | 2.00 | 1.33 |
| 1.3 | 1.00 | 2.05 | 0.78 | 1.83 | 1.93 | 1.89 | 1.64 | 1.25 |
| 1.4 | 1.00 | 1.56 | 0.82 | 1.39 | 1.52 | 1.43 | 1.50 | 1.04 |
| 1.5 | 1.00 | 1.45 | 0.85 | 1.32 | 1.52 | 1.27 | 1.35 | 1.00 |
| 1.6 | 1.00 | 1.39 | 0.82 | 1.36 | 1.50 | 1.29 | 1.38 | 1.10 |
| 1.7 | 1.00 | 1.35 | 0.81 | 1.37 | 1.47 | 1.38 | 1.43 | 1.17 |

The results clearly show that the system using propylene carbonate is significantly slower reacting than any of the systems.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for making a reaction injection molded elastomer comprising injecting a reaction mixture comprising
   a) an organic di- and/or polyisocyanate
   b) a polyether having at least two isocyanate-reactive groups and a molecular weight of from 1800 to 12,000 in which at least 50% of the isocyanate reactive groups are primary and/or secondary amine groups,
   c) an amine-terminated chain extender, and
   d) from 2 to 20 parts by weight per 100 parts by weight of components b) and c), of propylene carbonate, into a mold cavity via a RIM machine, the ratio of components being such that the isocyanate index is from about 70 to about 130.

2. The process of claim 1 wherein component d) is used in an amount of from 4 to 15 parts by weight, per 100 parts by weight of components b) and c).

3. The process of claim 1 wherein said polyether is obtained by the hydrolysis of a compound containing isocyanate end groups.

* * * * *